No. 731,471. PATENTED JUNE 23, 1903.
L. J. LE PONTOIS.
ELECTROMAGNETIC FRICTION CLUTCH.
APPLICATION FILED SEPT. 18, 1902.
NO MODEL.
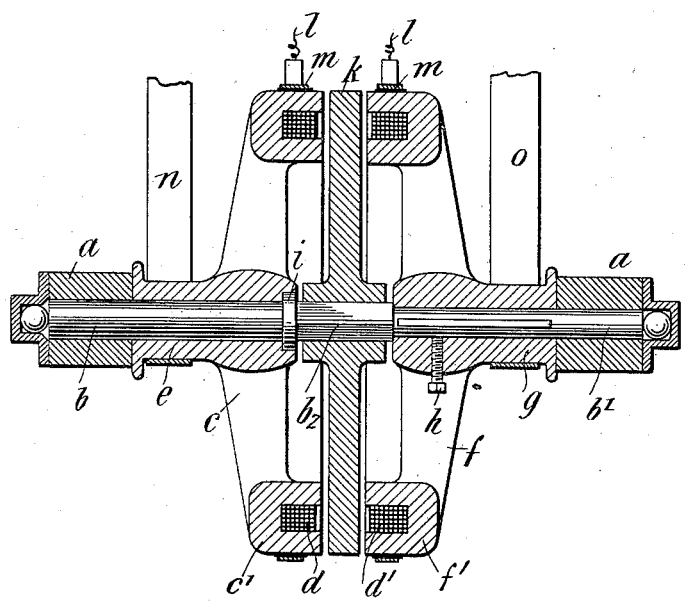

No. 731,471. Patented June 23, 1903.

UNITED STATES PATENT OFFICE.

LEON JULES LE PONTOIS, OF NEW YORK, N. Y.

ELECTROMAGNETIC FRICTION-CLUTCH.

SPECIFICATION forming part of Letters Patent No. 731,471, dated June 23, 1903.

Application filed September 18, 1902. Serial No. 123,939. (No model.)

*To all whom it may concern:*

Be it known that I, LEON JULES LE PONTOIS, a citizen of the Republic of France, and a resident of New York city, State of New York, have invented certain new and useful Improvements in Electromagnetic Friction-Clutches, of which the following is a specification.

My invention relates to an improvement in electromagnetic friction-clutches whereby the means of transmitting power is much simplified and the apparatus is much more compact and efficient than heretofore.

In the following I have illustrated, with reference to the accompanying drawing, one form of apparatus embodying my invention, the features thereof being more particularly pointed out hereinafter in the claims.

The drawing is a horizontal sectional view of a friction-clutch illustrating my invention.

In the drawing, $a\,a$ represent ball-bearings providing a seat for the shaft $b\,b'$. The shaft $b\,b'$ preferably has a central portion $b^2$ square in cross-section, the shaft on each side of said square portion being round in cross-section, the round portion $b'$ being of less diameter than the portion $b^2$ to permit of the ready removal and replacing of parts. At one end of the shaft, as at $b$, is an electromagnetic friction-clutch $c$, having an annular field $c'$, in which is placed the coil $d$. The clutch $c$ is preferably formed integral with a pulley $e$, turning loosely on the shaft $b$. On the other end of the shaft from the clutch $c$, as at $b'$, is an electromagnetic friction-clutch $f$, having an annular field $f'$, in which is placed a coil $d'$. The clutch $f$ is also preferably formed integral with a pulley $g$, which is keyed to the shaft $b\,b'$ and held against longitudinal movement thereon by the setscrew $h$. A collar $i$, keyed to the shaft, holds the pulley $e$ against longitudinal movement.

Between clutches $c$ and $f$ is a friction-disk $k$, mounted on the square portion $b^2$ of the shaft $b\,b'$, so as to turn therewith. The friction-disk $k$ is adapted to slide longitudinally on the squared portion $b^2$ of the shaft between the clutches $c$ and $f$.

The coils $d$ and $d'$ are energized from any appropriate source through wires $l\,l$ and contact-rings $m\,m$ and ground.

A belt $n$, receiving power from a suitable source, is passed around pulley $e$, and a belt $o$, passing around pulley $g$, transmits the power from the shaft to the point desired.

The operation of my device is as follows: The field $c'$ of clutch $c$, which is turned on the shaft $b\,b'$ by means of the belt $n$ acting on pulley $e$, is energized and attracts the friction-disk $k$ to it, so that disk $k$ turns with the clutch. The shaft $b\,b'$ being turned by the friction-disk $k$ transmits its motion through the pulley $g$ to the belt $o$. Should it be desired to release the friction-disk $k$ from the electromagnetic clutch $c$, the power which energizes the field $c'$ is cut off and the field $f'$ of electromagnetic clutch $f$ is magnetized, thus attracting the friction-disk $k$ to it, breaking the connection between the friction-disk and the electromagnetic clutch $c$, so that the said friction-clutch rotates loosely on the shaft $b\,b'$ and no motion is transmitted to the shaft.

It is obvious that many details of arrangement and construction may be changed without departing from the spirit of my invention.

What I claim, and desire to secure by Letters Patent of the United States, is—

1. In an electromagnetic friction-clutch a shaft, a driving-pulley turning on the shaft and carrying a clutch adapted to be magnetized, and a friction-disk turning with the shaft but free to move longitudinally thereon and adapted to be attracted against the clutch on the driving-pulley whereby the power of the latter is transmitted to the shaft.

2. In an electromagnetic friction-clutch, a shaft, a driving and a driven pulley on said shaft each carrying a clutch adapted to be magnetized, one of said pulleys riding loosely on the shaft and the other being keyed thereon, and a friction-disk between said pulleys turning with said shaft but free to move longitudinally thereon and adapted to be attracted from one pulley to the other.

3. In an electromagnetic friction-clutch a shaft, driving means adapted to be magnetized riding loosely on said shaft, driven means adapted to be magnetized keyed to said shaft and a friction-disk turning with said shaft between said means but free to move longitudinally on the shaft and adapted to be attracted from one means to the other.

4. In an electromagnetic friction-clutch a driving-shaft having a central squared portion and a round portion either side thereof, an electromagnetic clutch provided with a pulley riding loosely on one side of said squared portion, an electromagnetic clutch provided with a pulley keyed to the other side of said squared portion and a friction-disk mounted on the squared portion adapted to longitudinal movement whereby the same may be attracted from one clutch to the other.

In witness whereof I have signed my name in the presence of two subscribing witnesses.

LEON JULES LE PONTOIS.

Witnesses:
SEABURY C. MASTICK,
OTTO P. OSMERS.